United States Patent [19]

Anderson

[11] 4,436,630
[45] Mar. 13, 1984

[54] APPARATUS AND METHOD FOR SEPARATING A MIXTURE OF TWO LIQUIDS

[76] Inventor: Edward M. Anderson, 2620 E. Medicine Lake Blvd., Minneapolis, Minn. 55441

[21] Appl. No.: 374,344

[22] Filed: May 3, 1982

[51] Int. Cl.³ .................. C02F 1/40; B01D 12/00; B01D 21/24
[52] U.S. Cl. .................. 210/744; 210/199; 210/533; 210/119; 210/123
[58] Field of Search ............... 210/740, 744, 799, 800, 210/532.1, 533, 537, 540, 98, 114, 115, 119, 123; 137/172, 173, 192, 395, 397, 398, 423

[56] References Cited

U.S. PATENT DOCUMENTS

| | | | |
|---|---|---|---|
| 1,800,378 | 4/1931 | Everson | 210/123 |
| 2,193,261 | 3/1940 | Thomson | 137/172 |
| 2,315,017 | 3/1943 | Thompson | 210/123 |
| 2,701,620 | 2/1955 | Crawford | 137/172 |
| 3,035,701 | 5/1962 | May | 210/114 |
| 3,088,592 | 5/1963 | Clark | 210/114 |
| 3,318,448 | 5/1967 | Fryer | 210/123 |
| 3,443,692 | 5/1969 | Halsey | 210/114 |
| 4,055,499 | 10/1977 | Laxo | 210/119 |

Primary Examiner—Charles N. Hart
Assistant Examiner—Wanda L. Millard
Attorney, Agent, or Firm—Henry C. Kovar

[57] ABSTRACT

Apparatus for physically separating a mixture of a first less dense liquid and a second more dense liquid has an upright container with a liquid inlet, a lower outlet adjacent the bottom and having a flow control valve, a lower float in the container but above the lower outlet, a second float above the lower float, an upper outlet above the second float, and an upper float above the upper outlet; the lower and second floats are connected in parallel with the lower float being connected to the lower outlet valve, and the second and upper floats are connected in series to the upper outlet valve; the lower and second floats are fillable and sink in the less dense liquid and rise in the more dense liquid, the upper float is air filled and rises in either liquid. A method of separating the two liquids includes the steps of ballasting the lower and second floats, opening the lower outlet in response to raising the lower float, raising the second float and thereby energizing a normally de-energizing upper float upon the second float rise and thereby opening an upper outlet for the less dense liquid, the lower and second floats are ballasted to a specific gravity inbetween the specific gravities of the less and more dense liquids and the upper float is bouyant in the less dense liquid.

10 Claims, 4 Drawing Figures

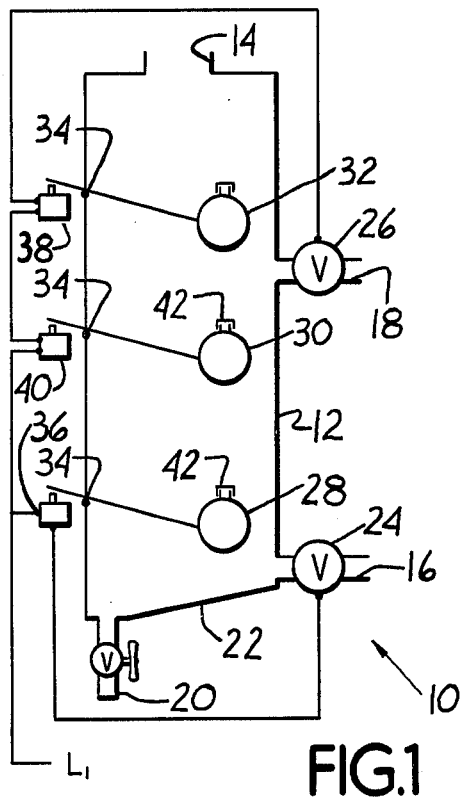
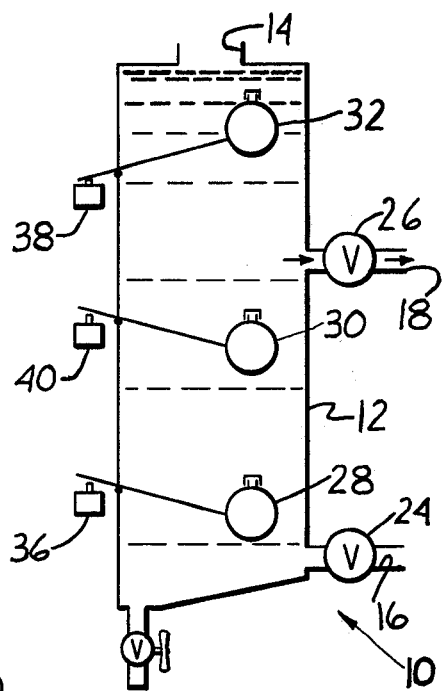
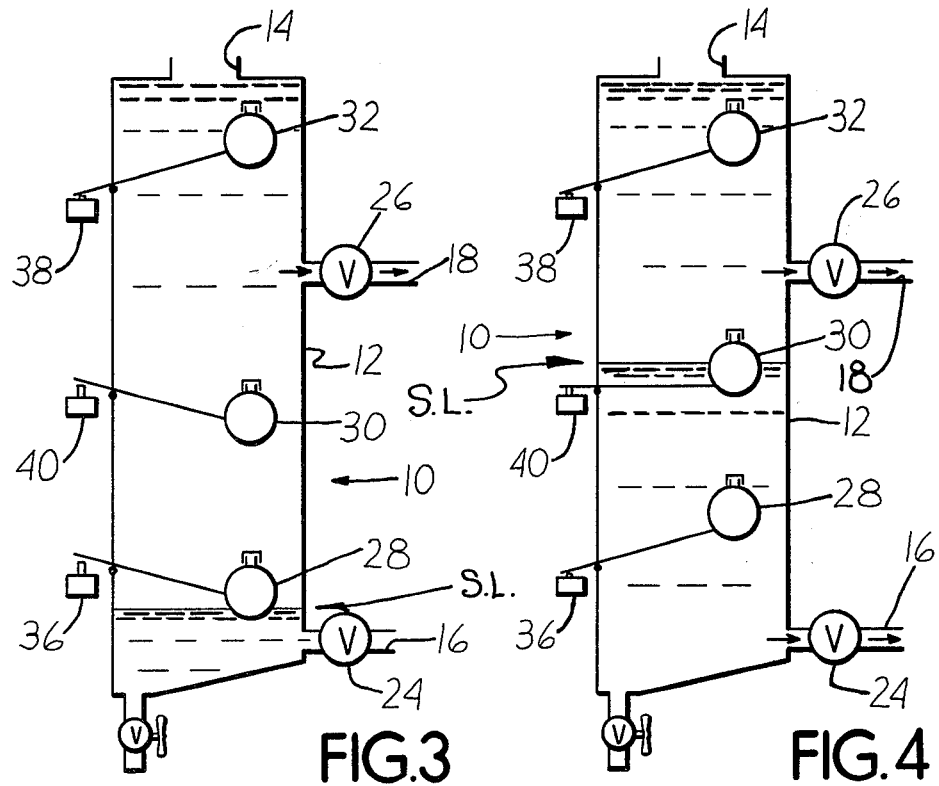
FIG.1 FIG.2 FIG.3 FIG.4

APPARATUS AND METHOD FOR SEPARATING A MIXTURE OF TWO LIQUIDS

BACKGROUND OF THE INVENTION

1. Field of the Invention

This invention pertains to an apparatus and a method for separating a mixture of two different liquids of less and greater specific gravities, for example, a mixture of oil and water.

2. The Prior Art

The prior art separators have featured a two float control, specifically one float for on a lower outlet for water and a second float for on an upper outlet for oil. Specific examples of this prior art are U.S. Pat. Nos. 2,315,017 and 4,055,499. There prior art devices do not perceive the need for delaying opening of the upper or lower outlet by sensing the stratification level inbetween their floats, nor do they solve the problem of keeping the stratification level away from the open outlets in order to separate more pure liquids.

OBJECTS OF THE PRESENT INVENTION

It is an object of the present invention to provide an improved apparatus for separating a mixture of two different liquids.

It is an object of the present invention to provide an improved apparatus having physically separate but electrically interconnected floats for opening valves and separating a mixture of two different liquids.

It is an object of the present invention to provide an improved method of separating a mixture of two different liquids.

SUMMARY OF THE INVENTION

In accordance with the principles of this invention, apparatus for separating a mixture of a first less dense and a second more dense liquid has an upright container with a liquid inlet, a lower outlet for passing more dense liquid, a low float above the low outlet, flow control means in the lower outlet and connected to the low float, an upper outlet for less dense liquid at a level above the low float, a second float between the upper outlet and low float and an upper outlet flow control connected to the second float, said second float and upper outlet flow control being connected is parallel with the low float and lower outlet flow control. An improved method of separating less and more dense liquids includes the novel step of de-energizing an upper float and closing an outlet for the less dense liquid as a stratification level rises and raises a second float.

BRIEF DESCRIPTION OF THE DRAWINGS

FIG. 1 is a schematic elevational side view of apparatus for separating a mixture of two liquids, the apparatus being shown empty and with wiring;

FIG. 2 is the same view as FIG. 1, with the apparatus filled with a less dense liquid;

FIG. 3 is the same view as FIG. 1 with the apparatus having some more dense liquid; and FIG. 4 is the same view as FIG. 1, with the apparatus having about one-half of its height filled with more dense liquid.

AS SHOWN ON THE DRAWINGS

The principles of the present invention are particularly useful when embodied in and/or practiced with an apparatus for separating a mixture of two different density liquids, such as shown in FIG. 1 and generally referred to by the numeral 10. The apparatus 10 is ideally suited for separating petroleum liquids from water.

The apparatus 10 has an upright liquid container 12 having a liquid inlet 14, a lower liquid outlet 16, an upper liquid outlet 18, and a drain outlet 20 from the container bottom 22. A normally closed valve 24 is in the lower outlet 16 for controlling flow there through and a similar normally closed valve 26 is in the upper outlet for controlling flow there through. The valves 24, 26 are independent and are not operatively connected.

An important feature of the present invention is the floats within the container 10, specifically a low float 28 at an elevational level above the level of the lower outlet 16, a second float 30 at an elevational level between the low float 28 and the upper outlet 18, and an upper float 32 at a level above the level of the upper outlet 18. Each of the floats 28, 30, 32 extends through the wall of the container 10 and is pivotally mounted in a fulcrum 34. The second flat 30 is essentially a stratification float and it follows up and down a stratification level between less and more dense liquids in the apparatus 10.

The low float 28 has a normally open switch 36 that is operatively connected to the lower valve 24. The upper float 32 likewise has a normally open switch 38 connected to the upper valve 26. The second float 30 has a normally closed switch 40 which is connected inbetween line power L1 and the upper float switch 38. The second float switch 40 and upper float switch 38 are connected in series to the power L1, and the lower float switch 36 and second float switch 40 are connected in parallel to the power L1. The low, second and upper floats 28, 30, 32 are each independently mounted to the container 12 and they each are operable completely independent of each other. All of the floats 28, 30, 32 are hollow. The low float 28 and second float 30 each may have a removable liquid-seal tight cap 42 which is removable and these floats 28, 30 are filled with the lesser density liquid which gives these floats 28, 30 a specific gravity which is similar, and which is slightly more dense than the less dense liquid, but less dense than the more dense liquid. The upper float 32 is air filled and is of less density than any less dense liquid to be separated.

In the practice of the method of the present invention, a mixture of two liquids of different densities is admitted into the container 12 through the inlet 14. The more dense liquid is usually water; the less dense liquid is usually a petroleum such as crude, fuel oil, diesel, gasoline, and the like. The low float 28 and second float 30 are filled with the anticipated less dense liquid. Alternatively the floats 28, 30 may be preweighted to a predetermined specific gravity and be adjustable; several well-known structures such as counterweights are known for this function.

As the apparatus 10 is in FIG. 1, normally empty, the floats 28, 30, 32 are all down and both outlet valves 24, 26 are closed.

When the apparatus 10 is filled with the less dense liquid, i.e. oil, as in FIG. 2, the low and second floats 28, 30 remain down and upper float 32 rises closing switch 38 and opening the upper valve 26 allowing the less dense liquid to flow out.

When the more dense liquid, i.e. water, begins to accumulate in the lower part of the apparatus 10, as shown in FIG. 2, the low float 28 remains down even when the level of more dense liquid is above the low outlet 16. This gives the accumulated more dense liquid (water) time to coalesce and minimize the probability of less dense liquid (oil) going out of lower outlet 16.

When the level of the more dense liquid rises above the low float 28 as shown in FIG. 4, the low float 28 rises and closes switch 36 and thereby opens the lower outlet valve 24 and the more dense liquid (water) flows out of the lower outlet 16.

As the level of the more dense liquid rises, the second float 30 rises and opens switch 40 which thereby de-energizes the upper float switch 38 and if the upper float 32 is raised, this effectively closes the upper outlet valve 26 and terminates outlet flow of the less dense liquid. The lower valve 24 remains open and outlet flow of the more dense liquid continues until the level of the more dense liquid falls and retreats from the upper outlet 18. As the level of the more dense liquid falls, the second float 30 also falls and when switch 40 re-closes, the upper valve 26 will re-open provided that the upper float 32 is raised by the presence of less dense liquid. The upper valve 26 is closed when either of the upper float 32 is lowered or the second float 30 is raised.

This apparatus and method have several advantages. Both outlets 16, 18 can be concurrently open as shown in FIG. 4. As the level between the more and less dense liquid approaches the lower outlet 16, the lower outlet valve 24 is closed. As this level approaches the upper outlet 18, the upper valve 26 closes. The height of the container 12 and the spacing between the floats 28, 30, 32 determines the range and sensitivity of the valve closing and/or opening functions. The apparatus 10 lends itself to gravity with no pressure, or to full pressurization; a given apparatus may work with both.

Although other advantages may be found and realized and various and minor modifications may be suggested by those versed in the art, be it understood that I wish to embody within the scope of the patent warranted hereon, all such improvements as reasonably and properly come within the scope of my contribution to the art.

I claim as my invention:

1. Apparatus for physically separating a mixture of two liquids, a first of the liquids being less dense than a second and more dense liquid, said apparatus comprising
   (a) an upright liquid container;
   (b) a liquid inlet into the container for introduction of the mixture into the container;
   (c) a lower liquid outlet adjacent the bottom of the container for passing the more dense liquid from the container;
   (d) a low float in the container and at an elevational level above the level of the lower outlet;
   (e) means in said lower outlet and operatively connected to said low float for controlling flow through said outlet;
   (f) an upper liquid outlet from the container, said upper outlet being at an elevational level above the elevational level of the low float;
   (g) a second float in the container and at an elevational level between the low float and the upper liquid outlet, said low and second floats being of similar specific gravities which are more dense than the first liquid but less dense than the second liquid; and
   (h) means in said upper outlet operatively connected only to said second float for controlling flow only through said upper outlet and being independent of flow control in the lower outlet, said second float and upper outlet flow control means being connected in parallel with said low float and lower outlet flow control means.

2. Apparatus according to claim 1, including
   (a) an upper float in the container and at an elevational level above the level of the upper liquid outlet, said upper float being connected in series between the second float and the upper liquid outlet flow control means; and
   (b) in which the low, second and upper floats are operable completely independently of each other.

3. Apparatus according to claim 2, in which the second float includes a normally closed switch and the upper float includes a normally open switch, said float switches being electrically connected by power to normally closed to normally open to the upper outlet flow control means.

4. Apparatus according to either of claims 1, or 2 in which low and second floats are hollow and are fillable with the first and less dense liquid, said floats having means for sealing the less dense fluid therein.

5. Apparatus according to either of claims 2 or 3 in which the low and second floats have means for being filled with the less dense liquid, and the upper float is filled with air.

6. A method of separating a mixture of a first and less dense liquid from a second and more dense liquid, comprising the steps of
   (a) ballasting a pair of floats to a specific gravity inbetween the specific gravities of the less and more dense liquids;
   (b) immersing the floats in the mixture;
   (c) opening a lower outlet in response to the raising of a lower said ballasted float by a rising level of the more dense liquid and normally closing the lower outlet in the absence of a predetermined level of more dense liquid;
   (d) following upwardly a stratification level between the less and more dense liquids with a second and independent middle said ballasted float;
   (e) de-energizing a normally energized upper float which is energized by the presence of either less or more dense liquid upon the rising of the second said float; and
   (f) closing an upper outlet for less dense liquid when both of the upper and second floats are raised.

7. The method of claim 6, including the further step of energizing the upper float and opening the upper outlet when the second float is lowered in response to a lowering of the level of the more dense liquid.

8. The method of claim 7, including the step of closing the upper liquid outlet upon either of lowering of the upper float or raising of the second float.

9. Apparatus for continually physically separating a first and less dense liquid from a second and more dense liquid comprising
   (a) a liquid container having an inlet for a mixture of the first and second liquids
   (b) a lower outlet adjacent the container bottom for the more dense liquid, said outlet having a valve for controlling flow therethrough;
   (c) an upper outlet substantially above the lower outlet, said upper outlet being for the less dense liquid and having a valve for controlling flow therethrough;

(d) a low float above the lower outlet and connected to the lower outlet valve for opening the lower valve;

(e) an upper float above the upper outlet and connected to the upper outlet valve;

(f) discrete middle float means between the upper outlet and low float for (1) closing the upper valve when a stratification level between the less and more dense liquids approaches the upper outlet and for (2) opening the upper valve when the stratification level between the less and more dense liquids retreats downward from the upper outlet.

10. Apparatus according to claim 9, in which said discrete middle means is connected to the upper outlet valve in series with the upper float.

* * * * *